United States Patent
Inoue

(10) Patent No.: US 8,105,548 B2
(45) Date of Patent: Jan. 31, 2012

(54) MANUFACTURING DEVICE FOR ZEOLITE MEMBRANE

(75) Inventor: Soushi Inoue, Chiyoda-ku (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1089 days.

(21) Appl. No.: 11/916,765

(22) PCT Filed: Jun. 6, 2006

(86) PCT No.: PCT/JP2006/311314
§ 371 (c)(1),
(2), (4) Date: Dec. 6, 2007

(87) PCT Pub. No.: WO2006/132237
PCT Pub. Date: Dec. 14, 2006

(65) Prior Publication Data
US 2009/0130000 A1 May 21, 2009

(30) Foreign Application Priority Data
Jun. 10, 2005 (JP) .................................. 2005-171122

(51) Int. Cl.
*B01J 19/02* (2006.01)
(52) U.S. Cl. ........ 422/198; 422/129; 423/700; 423/701; 423/702; 423/703; 423/704; 423/705; 423/706; 423/707; 423/708; 423/709; 423/710; 423/711; 423/712; 423/713; 423/714; 423/715; 423/716; 423/717; 423/718
(58) Field of Classification Search .................. 422/129, 422/198; 423/700–718; 210/263–320
See application file for complete search history.

(56) References Cited

U.S. PATENT DOCUMENTS
3,662,563 A * 5/1972 Sudmeier ...................... 62/243
(Continued)

FOREIGN PATENT DOCUMENTS
EP 0 976 440 A1 2/2000
(Continued)

OTHER PUBLICATIONS
Burriesci, N., et al., "Influence of Temperature on Hydrothermal Synthesis of Zeolites from Lipari Pumice," Materials Chemistry and Physics, Apr. 1983, pp. 305-314, vol. 8, No. 4, Elsevier Sequoia, Netherlands, XP022846979.
(Continued)

*Primary Examiner* — Michael Kornakov
*Assistant Examiner* — Kenneth A Bratland, Jr.
(74) *Attorney, Agent, or Firm* — Sughrue Mion, PLLC

(57) ABSTRACT

A zeolite membrane production apparatus is provided having a reaction container having a support insertion opening for insertion of tubular supports and which houses a reaction solution for formation of zeolite membranes on the surfaces of the supports, a heating means for heating the reaction solution through the reaction container, and a supporting apparatus provided on the reaction container in a freely detachable manner and which supports a plurality of the supports. The inner wall surface of the reaction container has two mutually parallel flat surfaces, the supporting apparatus has a plurality of supporting sections that anchor one end of each of the plurality of supports, and the plurality of supporting sections are provided in the supporting apparatus such that when the supporting apparatus is set in the reaction container, each of the plurality of supports is disposed between the two flat surfaces and parallel to the two flat surfaces.

16 Claims, 7 Drawing Sheets

U.S. PATENT DOCUMENTS

| | | | |
|---|---|---|---|
| 5,554,286 A | 9/1996 | Okamoto et al. | |
| 6,620,320 B1 | 9/2003 | Hying et al. | |
| 6,767,384 B1 | 7/2004 | Vu et al. | |
| 7,798,334 B2 * | 9/2010 | Mizuno et al. | 210/500.22 |
| 2001/0056215 A1 | 12/2001 | Verduijn et al. | |
| 2003/0044350 A1 | 3/2003 | Lam et al. | |
| 2005/0067344 A1 | 3/2005 | Tanaka et al. | |
| 2006/0011535 A1 * | 1/2006 | Ikeda et al. | 210/321.79 |
| 2007/0265484 A1 | 11/2007 | Li et al. | |
| 2009/0220414 A1 | 9/2009 | Mizuno | |
| 2010/0233364 A1 | 9/2010 | Mizuno et al. | |

FOREIGN PATENT DOCUMENTS

| | | |
|---|---|---|
| JP | 63-291809 A | 11/1988 |
| JP | 7-109116 A | 4/1995 |
| JP | 8-257301 | 10/1996 |
| JP | 8-257302 A | 10/1996 |
| JP | 8-318141 A | 12/1996 |
| JP | 10-036113 A | 2/1998 |
| JP | 10-114516 A | 5/1998 |
| JP | 10-212117 A | 8/1998 |
| JP | 2000-042387 A | 2/2000 |
| JP | 2001-097715 A | 4/2001 |
| JP | 2002-018247 A | 1/2002 |
| JP | 2002-058972 A | 2/2002 |
| JP | 2003-326142 A | 11/2003 |
| JP | 2004-082008 A | 3/2004 |
| JP | 2004-123415 A | 4/2004 |
| JP | 2005-125313 A | 5/2005 |
| JP | 2006-159031 A | 6/2006 |
| JP | 2006-008510 | 12/2006 |
| WO | 96/01683 A1 | 1/1996 |
| WO | 02/38258 A1 | 5/2002 |
| WO | WO 2005/014481 A1 | 2/2005 |
| WO | WO 2005014481 A1 * | 2/2005 |
| WO | 2006/059394 A1 | 6/2006 |

OTHER PUBLICATIONS

Extended European Search Report on EP Application No. 06781804.7 dated Oct. 5, 2009.

Extended European Search Report on EP Application No. 07714860.9 dated Apr. 26, 2010.

International Search Report on Application No. PCT/JP2007/053389 dated Mar. 20, 2007.

Li et al., "SAPO-34 membranes for CO2/CH4 separation," Journal of Membrane Science, 241:121-135 (2004).

First Examination Report for India Application No. 1677/DELNP/2008, dated Jul. 18, 2011.

* cited by examiner (a)

(b)

MANUFACTURING DEVICE FOR ZEOLITE MEMBRANE

TECHNICAL FIELD

The present invention relates to a zeolite membrane production apparatus.

BACKGROUND ART

Zeolite, a typical crystalline porous material, is a material that has solid acid properties, ion exchange properties, adsorption/separation properties and molecular pores as a result of its porous structure. In recent years, membranes made of zeolite (zeolite membranes) have been the subject of interest as separation membranes for water in organic solvents.

A well-known method for producing a zeolite membrane is the "hydrothermal synthesis" method, wherein: a support is contacted with a reaction solution containing the raw material for a zeolite membrane, which is composed mainly of silica source and alumina source; and the reaction solution is heated to form the zeolite membrane on the surface of the support.

The apparatus used for the hydrothermal synthesis method consists primarily of: a reaction container with a cylindrical inner wall surface; and a heating apparatus that heats the reaction container (for example, see Patent document 1). In the apparatus, a single support is dipped in the reaction solution inside the reaction container and separated from the cylindrical inner wall surface; and the reaction solution is contacted with the support, and heated with the heating apparatus through the reaction container, to form a uniform zeolite membrane on the support.

Patent document 1: International Patent Publication No. 2005/014481

DISCLOSURE OF THE INVENTION

Problem to be Solved by the Invention

Mass production of zeolite membranes requires: dipping of a plurality of supports into a reaction solution in a single reaction container, and simultaneous formation of zeolite membranes on the plurality of supports.

With the reaction container described in Patent document 1, however, if a plurality of supports are simultaneously situated in the reaction container for contact with the reaction solution, and the reaction solution is heated, non-uniform zeolite membranes tends to be formed on the plurality of supports. Therefore, with the reaction container described above, it has been difficult to simultaneously form zeolite membranes which are uniform with respect to a plurality of supports, and it has been unavoidably necessary to form zeolite membrane for each support. The reaction container described in Patent document 1 thus has low productivity, and is unsuitable for mass production.

It is therefore an object of the present invention to provide a zeolite membrane production apparatus that can simultaneously form zeolite membranes which are uniform with respect to a plurality of supports.

Means for Solving the Problem

As a result of diligent research directed toward solving the problem mentioned above, the present inventors considered that the reason why zeolite membranes which are uniform with respect to a plurality of supports cannot be formed in a reaction container having a cylindrical inner wall surface may be that the convection of the reaction solution produced by heating the reaction solution is non-uniform. The present inventors then investigated the shape of the support, the shape of the inner wall surface, their relationships, etc., which all could potentially influence the convection of the reaction solution. As a result, the present inventors discovered that the aforementioned problem can be solved by the following invention, and the present invention was completed.

The present invention is a zeolite membrane production apparatus comprising:

a reaction container which has a support insertion opening for insertion of tubular supports and which houses a reaction solution for formation of zeolite membranes on the surfaces of the supports, a heating means for heating the reaction solution through the reaction container, and a supporting apparatus which is provided on the reaction container in a freely detachable manner and which supports a plurality of the supports;

wherein:

the inner wall surface of the reaction container has two mutually parallel flat surfaces, the supporting apparatus has a plurality of supporting sections that anchor one end of each of the plurality of supports, and the plurality of supporting sections are provided in the supporting apparatus in such a manner that when the supporting apparatus is set in the reaction container, each of the plurality of supports is disposed between the two flat surfaces and parallel to the two flat surfaces.

In the zeolite membrane production apparatus described above, one end of each of the plurality of supports is anchored to a supporting section. When the plurality of supports are inserted through the support insertion opening of the reaction container, and the supporting apparatus is set in the reaction container, the plurality of supports become immersed in the reaction solution inside the reaction container. Also, the plurality of supports are arranged between the two parallel flat surfaces in the reaction container. When the reaction container is heated by the heating means in this state, the reaction solution is heated through the reaction container, and zeolite membrane is formed on the surface of each of the plurality of supports. Since the plurality of supports are arranged parallel to the two parallel flat surfaces, zeolite membranes which are uniform with respect to the plurality of supports can be simultaneously formed on the plurality of supports. While the reason is not completely understood, it is presumed to be that when the reaction solution is heated, the convection of the reaction solution created around each of the plurality of supports will be uniform between the supports, resulting in uniform transfer of heat to the plurality of supports. Thus, the production apparatus described above improves zeolite membrane productivity and allows mass production. Moreover, production of zeolite membranes in a reaction container usually requires exchange of the reaction solution each time; however, the production apparatus described above makes it possible to simultaneously produce zeolite membranes on a plurality of supports as mentioned above, and therefore allows a reduction in the amount of reaction solution used for each support, and a reduction in running costs.

In the zeolite membrane production apparatus described above, the plurality of supporting sections are preferably arranged linearly. This causes the plurality of supports supported by the plurality of supporting sections to be linearly arranged, so that when the reaction solution is heated, the convection of the reaction solution created around each of the plurality of supports will be more uniform between the supports, resulting in more uniform transfer of heat to the plurality of supports. It is therefore possible to form zeolite membranes which are more uniform with respect to the plurality of supports.

In the zeolite membrane production apparatus described above, the supporting apparatus is preferably further provided with: a supporting bar comprising the plurality of supporting sections; an anchoring bar positioned opposite the supporting bar and comprising a plurality of anchoring sections that anchor the other end of each of the plurality of supports; and a connecting member which connects the supporting bar and the anchoring bar. In this case, one end of the support is anchored to the supporting section of the supporting bar, while the other end is anchored to the anchoring section of the anchoring bar, thus allowing anchoring of both ends of the support. Drifting of the supports by the convection created upon heating the reaction solution can thereby be prevented. It is therefore possible to form zeolite membranes which are more uniform with respect to the plurality of supports.

In the zeolite membrane production apparatus described above, the plurality of supporting sections are preferably arranged at equal spacings. This allows the plurality of supports supported by the plurality of supporting sections to be arranged at equal spacings. If the plurality of supports are arranged at equal spacings, the convection of the reaction solution created around each of the plurality of supports upon heating the reaction solution will be even more uniform between the supports, resulting in even more uniform transfer of heat to the plurality of supports It is therefore possible to form zeolite membranes which are even more uniform with respect to the plurality of supports.

In the zeolite membrane production apparatus described above, the reaction container preferably has at least one outlet at the bottom surface. The outlet preferably has a tapered shape such that the opening area decreases with distance from the bottom surface. That is, the opening area of the outlet is preferably larger toward the bottom surface and smaller away from the bottom surface. Repeating the procedure of forming zeolite membranes on the support surfaces using the reaction container described above will tend to result in accumulation of impurities such as residue on the bottom surface of the reaction container. These impurities include unreacted substances, zeolite particles, amorphous components and the like, and can adhere to the supports, causing the uniformity of the obtained zeolite membranes to be lowered. If the reaction container has at least one outlet at the bottom surface and the opening area of the outlet increases toward the bottom surface, impurities accumulating on the bottom surface of the reaction container are easily directed to the outlet to facilitate drainage of the impurities from the reaction container. That is, it is possible to inhibit deposition of impurities on the bottom surface, and therefore to prevent attachment of impurities to the supports. This allows zeolite membranes which are more uniform with respect to the plurality of supports to be formed on the support surfaces. The reaction container, incidentally, can also be reinforced by providing the outlet of the reaction container with the tapered shape described above.

EFFECTS OF THE INVENTION

According to the present invention, there is provided a zeolite membrane production apparatus that can simultaneously form zeolite membranes which are uniform with respect to a plurality of supports.

BRIEF DESCRIPTION OF THE DRAWINGS

FIG. 4(a) shows the supporting bar, and FIG. 4(b) shows the anchoring bar.

EXPLANATION OF REFERENCE NUMERALS

Figure 1:
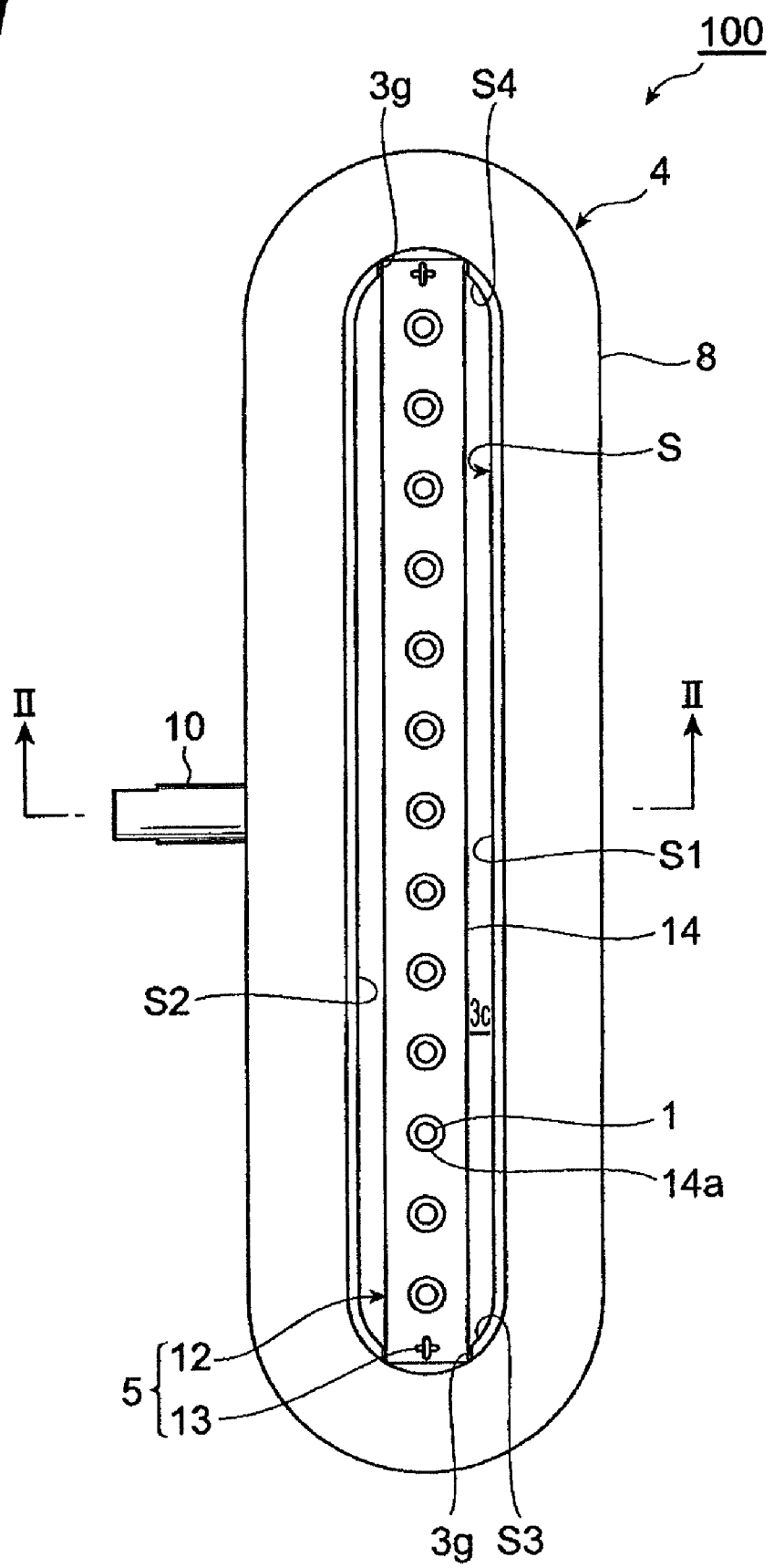
FIG. 1 is a plan view of a preferred embodiment of the zeolite membrane production apparatus of the present invention.

1: Support; 2: reaction solution; 3: reaction container; 3a: bottom section; 3b: side wall section; 3c: support insertion opening; 3d: outlet; 3e: bottom surface; 3f: peripheral surface; 3g: notch; 4: heating apparatus (heating means); 5: supporting apparatus; 6: reaction solution inlet tube; 7: reaction solution outlet tube; 8: jacket section (heating means); 8a: inner wall surface; 9: fluid circulation chamber (heating means); 10: fluid outlet tube (heating means); 11: fluid inlet tube (heating means); 12: anchoring frame; 13: chain; 14: supporting bar; 14a: supporting section; 14b, 14c: wall section; 14d, 14e: opening; 15: anchoring bar; 15a: anchoring section; 15b, 15c: wall section; 15d, 15e: opening; 16a, 16b: connecting member; 17: tube; 17a: opening; 18: hook section; 19: cover section; 19a: flat surface; 20: handle section; 21: supply tank; 22: separator; 23: liquid nitrogen trap; 24: vacuum pump; 25: vacuum gauge; 26, 27: conduit; 28: stirrer; S: inner wall surface; S1, S2: flat surface; S3, S4: curved surface; V1: reaction solution inlet valve; V2: reaction solution outlet valve; 100: zeolite membrane production apparatus.

BEST MODES FOR CARRYING OUT THE INVENTION

Embodiments of the present invention will now be explained in detail with reference to the accompanying drawings. Identical or equivalent components will be indicated by the same reference numeral in the drawings, and overlapped explanations will be omitted. Also, the dimensional proportions depicted in the drawings are not limitative.

(Zeolite Membrane Production Apparatus)

Preferred embodiments of the zeolite membrane production apparatus of the present invention will be explained first.

Figure 2:
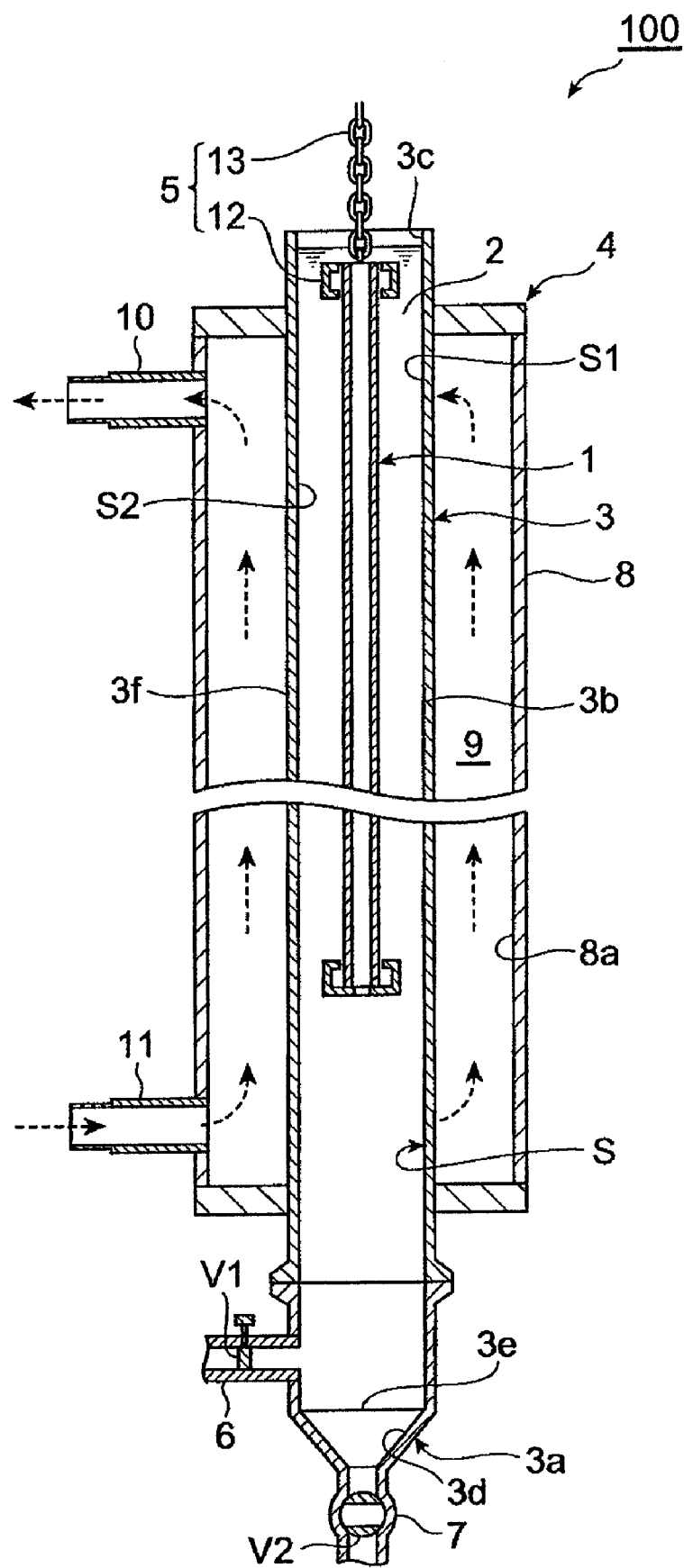
FIG. 2 is a cross-sectional view along line II-II of FIG. 1.
Figure 3:
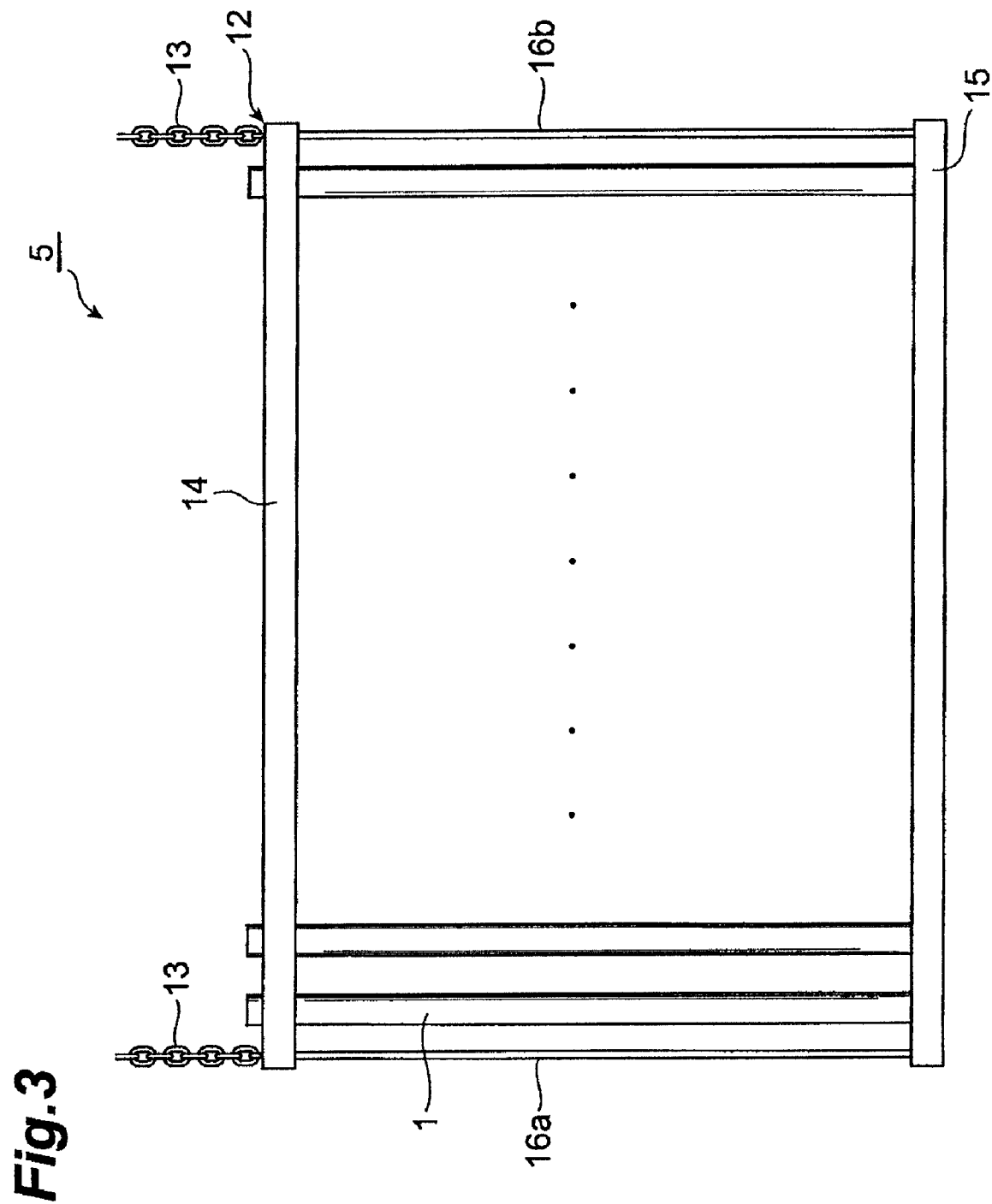
FIG. 3 is a front view of the supporting apparatus in FIGS. 1 and 2.
Figure 4:
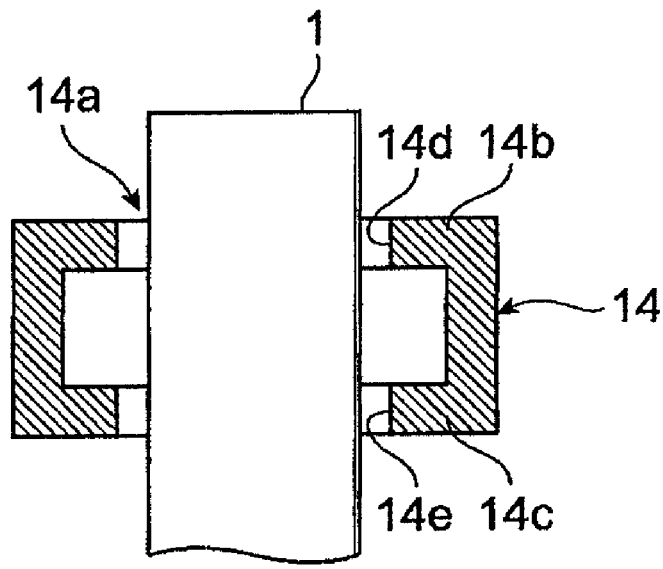
FIG. 4 is partial cross-sectional views of the supporting bar and anchoring bar to which the ends of the support are anchored.
Figure 4:
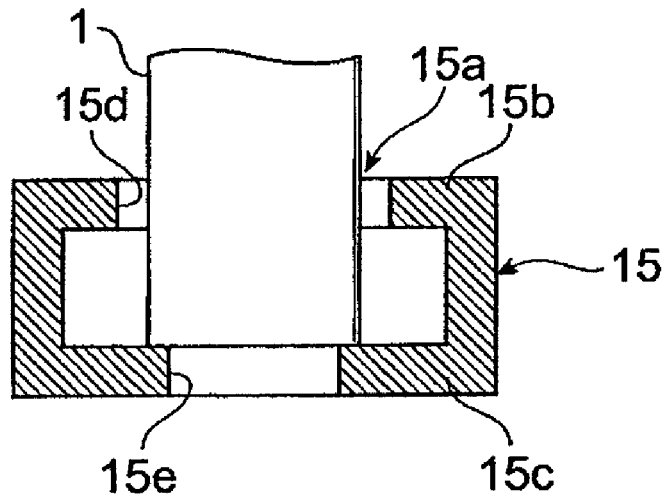
Figure 5:
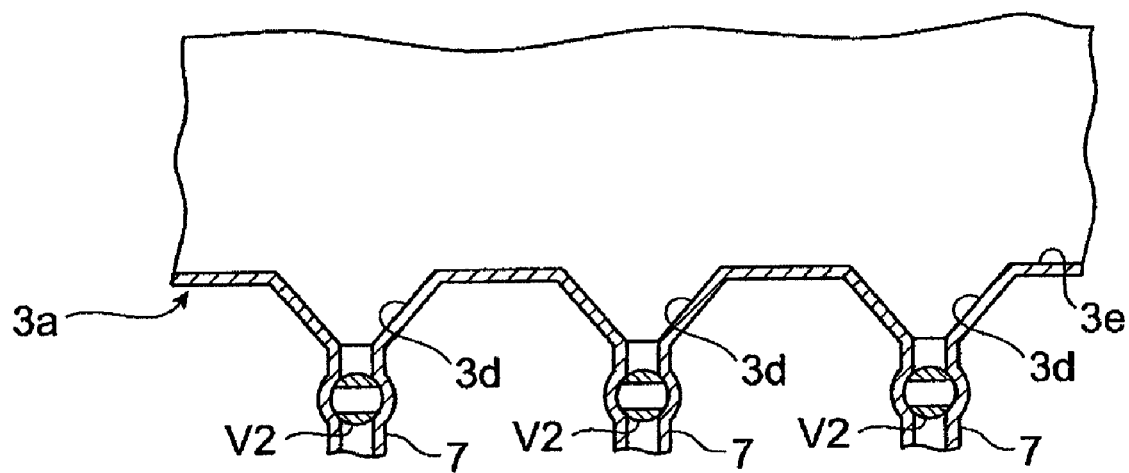
FIG. 5 is a partial cross-sectional view showing the structure of the bottom section of the reaction container.

FIG. 1 is a plan view of a preferred embodiment of the zeolite membrane production apparatus of the present invention. FIG. 2 is a cross-sectional view along line II-II of FIG. 1. FIG. 3 is a front view of the supporting apparatus in FIGS. 1 and 2. FIGS. 4(a) and 4(b) are partial cross-sectional views of the supporting bar and anchoring bar, respectively, to which the ends of the support are anchored. FIG. 5 is a partial cross-sectional view showing the structure of the bottom section of the reaction container.

As shown in FIGS. 1 and 2, the zeolite membrane production apparatus according to a preferred embodiment of the present invention (hereinafter also referred to simply as "production apparatus") 100 comprises: a reaction container 3 which houses a reaction solution 2 for formation of zeolite membranes on the peripheral surfaces of cylindrical supports 1; a heating apparatus 4 which heats the reaction solution 2 through the reaction container 3; and a supporting apparatus 5 which is provided on the reaction container 3 in a freely detachable manner and which supports a plurality of supports 1.

The reaction container 3 comprises: a bottom section 3a; and a side wall section 3b that extends from the circumference of the bottom section 3a. A support insertion opening 3c for insertion of a plurality of supports 1 is formed at the top of the side wall section 3b. The inner wall surface S of the side wall section 3b comprises two mutually opposing flat surfaces S1, S2 and smooth curved surfaces S3, S4 connecting them, and the two flat surfaces S1, S2 are parallel to each other.

Also, at the top of the reaction container 3, there are formed notches 3g that receive and anchor the ends of the supporting bar 14.

In addition, as shown in FIG. 2, a reaction solution inlet tube 6 for introduction of the reaction solution 2 is connected to the lower part of the reaction container 3, and a reaction solution inlet valve V1 for adjustment of the amount of introduced reaction solution 2 is set in the reaction solution inlet tube 6. As shown in FIG. 5, a plurality of outlets 3d are formed at the bottom surface 3e in the bottom section 3a of the reaction container 3. The outlet 3d has a tapered shape such that the opening area decreases with distance from the bottom surface 3e. That is, the opening area of the outlet 3d is larger toward the bottom surface 3e and smaller away from the bottom surface 3e. This shape allows impurities produced by heating of the reaction solution 2, such as unreacted substances, zeolite particles and amorphous components, to be easily directed to the outlet 3d.

Also, a reaction solution outlet tube 7 for discharge of the reaction solution 2 is connected via the outlet 3d to the bottom section 3a of the reaction container 3, and a reaction solution outlet valve V2 is set in the reaction solution outlet tube 7. Thus, when the reaction solution inlet valve V1 is opened, the reaction solution 2 is introduced into the reaction container 3 through the reaction solution inlet tube 6; on the other hand, when the reaction solution inlet valve Vi is closed, introduction of the reaction solution 2 is stopped. Also, when the reaction solution inlet valve V1 is closed and the reaction solution outlet valve V2 is opened, the reaction solution 2 in the reaction container 3 is discharged from the reaction solution outlet tube 7 through the outlet 3d. A removable cover (not shown in the drawings) that covers the support insertion opening 3c can be provided at the top of the reaction container 3.

Referring again to FIG. 2, the heating apparatus 4 comprises a tubular jacket section 8 surrounding the reaction container 3; and between the inner wall surface 8a of the jacket section 8 and the peripheral surface 3f of the reaction container 3, there is provided a fluid circulation chamber 9 through which circulates fluid at a higher temperature than the reaction solution 2. The boundary sections between the jacket section 8 and reaction container 3 are sealed so that the fluid does not leak out from the jacket section 8. A fluid inlet tube 11 communicated with the fluid circulation chamber 9 is connected to the lower part of the jacket section 8, while a fluid outlet tube 10 is connected to the upper part of the jacket section 8 above the fluid inlet tube 11. Thus, when the fluid at a higher temperature than the reaction solution 2 is introduced into the fluid circulation chamber 9 through the fluid inlet tube 11, the fluid fills the fluid circulation chamber 9 and is discharged from the jacket section 8 through the fluid outlet tube 10. The high temperature fluid is thereby constantly circulated in the fluid circulation chamber 9. This heats the reaction container 3, and the reaction solution 2 is heated by the heat added to the reaction container 3. In other words, the fluid at a higher temperature than the reaction solution 2 indirectly heats the reaction solution 2 via the reaction container 3. Steam may be introduced into the jacket section 8 instead of a high temperature fluid.

The supporting apparatus 5 is constructed of: an anchoring frame 12 for support and anchoring of the plurality of supports 1; and a chain 13 used for raising or lowering of the anchoring frame 12 into or out of the reaction container 3.

As shown in FIG. 3, the anchoring frame 12 comprises: a hollow supporting bar 14 for anchoring of one end of each of the plurality of supports 1; an anchoring bar 15 which is provided opposite the supporting bar 14 and which anchors the other end of each of the plurality of supports 1; and a pair of connecting members 16a, 16b which link the supporting bar 14 and anchoring bar 15.

The supporting bar 14 has a plurality of supporting sections 14a into which one end of each of the plurality of supports 1 is inserted, and the plurality of supporting sections 14a are arranged linearly along the lengthwise direction of the supporting bar 14. As shown in FIG. 4(a), the supporting section 14a has a pair of opposing wall sections 14b, 14c, with one wall section 14c being disposed at the side nearer to the anchoring bar 15, and with the other wall section 14b being disposed at the side opposite to the anchoring bar 15. Openings 14d, 14e for insertion of one end of the support 1 are formed in the two wall sections 14b, 14c.

The plurality of supporting sections 14a are preferably arranged at equal spacings. This allows the plurality of supports 1 supported by the plurality of supporting sections 14a to be arranged at equal spacings.

The chain 13 is also provided at both ends of the supporting bar 14. That is, the chain 13 is attached at both sides of the plurality of supporting sections 14a.

The anchoring bar 15 has a plurality of anchoring sections 15a into which the other end of each of the plurality of supports 1 is inserted, and the plurality of anchoring sections 15a are arranged linearly along the lengthwise direction of the anchoring bar 15. The anchoring sections 15a are identical in number to the supporting sections 14a, and each situated at a position opposite to a respective supporting section 14a. As shown in FIG. 4(b), the anchoring section 15a has a pair of opposing wall sections 15b, 15c, with one wall section 15b being disposed at the side nearer to the supporting bar 14, and with the other wall section 15c being disposed at the side opposite to the supporting bar 14. Openings 15d, 15e for insertion of the other end of the support 1 are formed in the two wall sections 15b, 15c. The opening 15d of the wall section 15b is larger than the outer diameter of the support 1, but the opening 15e of the wall section 15c is smaller than the outer diameter of the support 1 in order to prevent slipping of the support 1.

The supporting section 14a and anchoring section 15a are disposed between the two flat surfaces S1, S2 when the anchoring frame 12 of the supporting apparatus 5 is set in the reaction container 3. Thus, when one end of the support 1 is inserted into the supporting section 14a and the other end of the support 1 is inserted into the anchoring section 15a for anchoring of both ends of the support 1, the plurality of supports 1 become arranged between the two flat surfaces S1, S2 and parallel to the flat surfaces S1, S2.

Incidentally, formation of the opening 14d in the wall section 14b and formation of the opening 15e in the wall section 15c allows the reaction solution 2 to enter the inside of the supports 1, and therefore can cause the convection of the reaction solution 2 in the reaction container 3 to be more uniform, resulting in more uniform transfer of heat to the plurality of supports 1.

(Zeolite Membrane Production Process)

A zeolite membrane production process using the zeolite membrane production apparatus 100 will now be described.

First, a plurality of supports 1 are prepared. As the support 1 there is normally used a support wherein seed crystals are attached to the peripheral surface of the support body. By using a support wherein seed crystals are attached to the peripheral surface of the support body, it is possible to form a more uniform zeolite membrane on the support 1.

There are no particular restrictions on the support body, but it is preferably porous if the zeolite membrane is to be used as a separation membrane. As such a support body there may be mentioned one composed of a ceramic, organic polymer or metal. As a ceramic there may be mentioned mullite, alumina, silica, titania, zirconia or the like, and as a metal there may be mentioned stainless steel, sintered nickel, a mixture of sintered nickel and iron, or the like. Alumina is particularly preferred among these. When the support body is composed of alumina, elution of the material of the support body is inhibited. The support body may also be composed of sintered zeolite.

When the support body is porous, the mean pore size of the pores is preferably 0.1 µm to 20 µm, and more preferably 0.1 µm to 5 µm. A mean pore size of 0.1 µm to 20 µm will allow formation of a zeolite membrane with fewer pinholes than a mean pore size outside of this range, thus making it possible to obtain a zeolite membrane with higher separation performance. A mean pore size of less than 0.1 µm will prevent sufficient attachment of the seed crystals in the pores of the support body and will tend to result in peeling of the formed zeolite membrane, compared to a mean pore size within the range specified above. On the other hand, a mean pore size of greater than 20 µm will not allow the pores to be filled with the zeolite crystals and will tend to result in generation of pinholes and lowering of the separation performance, compared to a mean pore size within the range specified above. A mean pore size of 0.1 µm to 5 µm can yield a zeolite membrane with particularly high separation performance.

When a zeolite membrane is used for separation of a mixture of ethanol and water, for example, the separation performance is represented by the following formula:

(B1/B2)/(A1/A2)

where: the concentrations of water and ethanol in the mixture prior to separation are A1% by weight and A2% by weight, respectively, and the concentrations of water and ethanol in the liquid or gas permeating the zeolite membrane are B1% by weight and B2% by weight, respectively. A larger value means that a specific liquid at a higher concentration can be separated from the mixture, i.e. that the separation performance is higher.

The porosity of the support body is preferably 5% to 50% and more preferably 30% to 50%. A porosity of 5% to 50% will cause the gas permeability of the support body to be higher than a porosity outside of this range, thus making it possible to obtain a zeolite membrane with a high permeation rate. If the porosity is less than 5%, the gas permeation rate of the support body will tend to be low compared to the case where the porosity is within the range specified above; if the porosity is greater than 50%, the mechanical strength of the support 1 will tend to be low compared to the case where the porosity is within the range specified above. A porosity of 30% to 50% can yield a zeolite membrane with a particularly high permeation rate.

The permeation rate ($kg/m^2h$) means the permeation of a liquid through the zeolite membrane per unit time. For example, when a zeolite membrane is used for separation of water from a mixture of ethanol and water, the permeation rate is the permeation of the water through the zeolite membrane per unit time.

The seed crystals to be attached to the support body differ depending on the type of zeolite in the intended zeolite membrane. Normally, the same type of zeolite as the zeolite to be formed is used, but a different type may be used so long as it is zeolite with a similar crystal structure.

The plurality of supports 1 are then mounted in the anchoring frame 12 of the supporting apparatus 5. Specifically, one end of the support 1 is inserted into the openings 14d, 14e of a supporting section 14a, while the other end of the support 1 is inserted into the openings 15d, 15e of an anchoring section 15a. Both ends of the support 1 are thus firmly anchored to the anchoring frame 12.

On the other hand, a reaction solution 2 is introduced into the reaction container 3. Specifically, the reaction solution 2 is introduced into the reaction container 3 through the reaction solution inlet tube 6, with the reaction solution inlet valve V1 opened and the reaction solution outlet valve V2 closed.

The raw material for the zeolite membrane is contained in the reaction solution 2. The raw material for the zeolite membrane is composed mainly of alumina source and silica source, and may, if necessary, comprise alkali metal source and/or alkaline earth metal source. As alumina sources there may be mentioned aluminum salts such as aluminum hydroxide, sodium aluminate, aluminum sulfate, aluminum nitrate and aluminum chloride, as well as alumina powder, colloidal alumina and the like. As silica sources there may be mentioned alkali metal silicates such as sodium silicate, water glass and potassium silicate, as well as silica powder, silicic acid, colloidal silica, acid clay, kaolin, silicon alkoxides (such as aluminum isopropoxide) and the like. As alkali metal sources and alkaline earth metal sources there may be mentioned sodium chloride, potassium chloride, calcium chloride, magnesium chloride and the like. An alkali metal silicate functions as both a silica source and an alkali metal source.

The molar ratio of silica source and alumina source in the reaction solution 2 (calculated as $SiO_2/Al_2O_3$) may be appropriately set depending on the type of zeolite in the intended zeolite membrane.

Also, the concentrations of the silica and alumina sources are not particularly restricted. That is, the concentration of the silica and/or alumina source may be increased to form a gel-like reaction solution 2, or the concentration of the silica and/or alumina source may be lowered to create a low viscosity reaction solution 2.

The reaction solution 2 may also contain additives such as crystallization promoters. As crystallization promoters there may be mentioned tetrapropylammonium bromide, tetrabutylammonium bromide and the like.

The supporting apparatus 5 is then set in the reaction container 3. Specifically, the anchoring frame 12 is raised with the chain 13, and inserted into the reaction container 3 through the support insertion opening 3c from the anchoring bar 15 side of the anchoring frame 12. Both ends of the supporting bar 14 are then received in the respective notches 3g formed at the top of the reaction container 3, and the upper end of the reaction container 3 is closed with a cover. Thus, the anchoring frame 12 is immersed in the reaction solution 2 so that the plurality of supports 1 are immersed in the reaction solution 2. Here, the plurality of supports 1 are arranged between the two flat surfaces S1, S2 and parallel to the flat surfaces S1, S2.

The reaction solution 2 is then heated by the heating apparatus 4 via the reaction container 3. Specifically, fluid at a higher temperature than the reaction solution 2 is introduced into the fluid circulation chamber 9 in the jacket section 8 through the fluid inlet tube 11 to fill the fluid circulation chamber 9. Here, the reaction container 3 becomes surrounded by the fluid at higher temperature than the reaction solution 2, so that the reaction container 3 is heated by the fluid and that the reaction solution 2 is heated by the heated reaction container 3. This causes a reaction between the silica source and alumina source in the reaction solution 2, and zeolite crystals produced by the reaction are attached to the peripheral surfaces of the plurality of supports 1. Zeolite membranes are thus formed on the peripheral surfaces of the plurality of supports 1.

Furthermore, since the plurality of supports 1 are arranged between the two parallel flat surfaces S1, S2 and parallel to the flat surfaces S1, S2, it is possible to simultaneously form zeolite membranes which are uniform with respect to the plurality of supports 1. While the reason is not completely understood, it is presumed to be that when the reaction solution 2 is heated, the convection created around each of the plurality of supports 1 will be uniform between the supports, resulting in uniform transfer of heat to the plurality of supports 1. Thus, the production apparatus 100 improves zeolite membrane productivity and allows mass production. Moreover, production of zeolite membranes in a reaction container 3 usually requires exchange of the reaction solution 2 each time; however, the production apparatus 100 makes it possible to simultaneously produce zeolite membranes on the plurality of supports 1 as mentioned above, and therefore allows a reduction in the amount of reaction solution 2 used for each support and a reduction in running costs.

Repeating the procedure of forming zeolite membranes on the support 1 surfaces using the reaction container 3 will tend to result in accumulation of impurities such as residue on the bottom surface 3e of the reaction container 3. These impurities include unreacted substances, zeolite particles, amorphous components and the like, and can adhere to the supports 1, causing the uniformity of the obtained zeolite membranes to be lowered. In the production apparatus 100, since the reaction container 3 has at least one outlet 3d at the bottom surface 3e and the opening area of the outlet 3d increases toward the bottom surface 3e, impurities accumulating on the bottom surface 3e of the reaction container 3 are easily directed to the outlet 3d. Also, residue at the bottom section 3a of the reaction container 3 can be easily drained by opening the reaction solution outlet valve V2. In other words, with the production apparatus 100, it is possible to inhibit deposition of impurities on the bottom surface 3e, and therefore to prevent adhesion of the impurities to the supports 1. Consequently, more uniform zeolite membranes can be formed on the peripheral surfaces of the supports 1 than in the case where an outlet 3d with such a tapered shape is not formed. Furthermore, the reaction container 3 can also be reinforced by providing the outlet 3d of the reaction container 3 with such a tapered shape, so that the life of the reaction container 3 can be extended.

Also, since the plurality of supporting sections 14a are provided at equal spacings on the supporting bar 14, the convection of the reaction solution 2 created around each of the plurality of supports 1 upon heating the reaction solution 2 will be even more uniform between the supports, resulting in even more uniform transfer of heat to the plurality of supports 1. It is therefore possible to form zeolite membranes which are even more uniform with respect to the plurality of supports 1 than in the case where the plurality of supporting sections 14a are not arranged at equal spacings.

In addition, since the plurality of supporting sections 14a are arranged linearly along the lengthwise direction of the supporting bar 14, the plurality of supports 1 are also arranged in the same linear fashion. As a result, the convection of the reaction solution 2 will be more uniform with respect to the plurality of supports 1 than in the case where the plurality of supporting sections 14a are not arranged linearly; and this will result in more uniform transfer of heat to the plurality of supports 1. It is therefore possible to form zeolite membranes which are more uniform with respect to the plurality of supports 1.

The zeolite membrane production process described above can yield zeolite membranes with a variety of compositions and structures, including types MFI, X, Y, A and T.

The zeolite membrane production apparatus of the present invention is not limited to the embodiment described above.

In the embodiment described above, for example, both ends of the support 1 is anchored by the anchoring frame 12 of the supporting apparatus 5; however, the supporting apparatus used in the zeolite membrane production apparatus of the present invention may instead support only one of the ends of the support 1.

Also, in the embodiment described above, fluid at a higher temperature than the reaction solution 2 is introduced into the fluid circulation chamber 9 in the heating apparatus 4, and the reaction solution 2 is heated via the reaction container 3; however, water vapor or other steam may be used instead of the fluid. The reaction solution 2 can be heated in this manner as well.

Furthermore, in the embodiment described above, the support insertion opening 3c is covered with a cover; however, the supporting bar 14 is preferably one that is of such a size as to cover the support insertion opening 3c and that serves also as the cover. This can minimize flying-off of the reaction solution 2 and temperature reduction of the reaction solution 2 during production of the zeolite membranes, while it also allows a reduction in the number of parts used.

Figure 6:
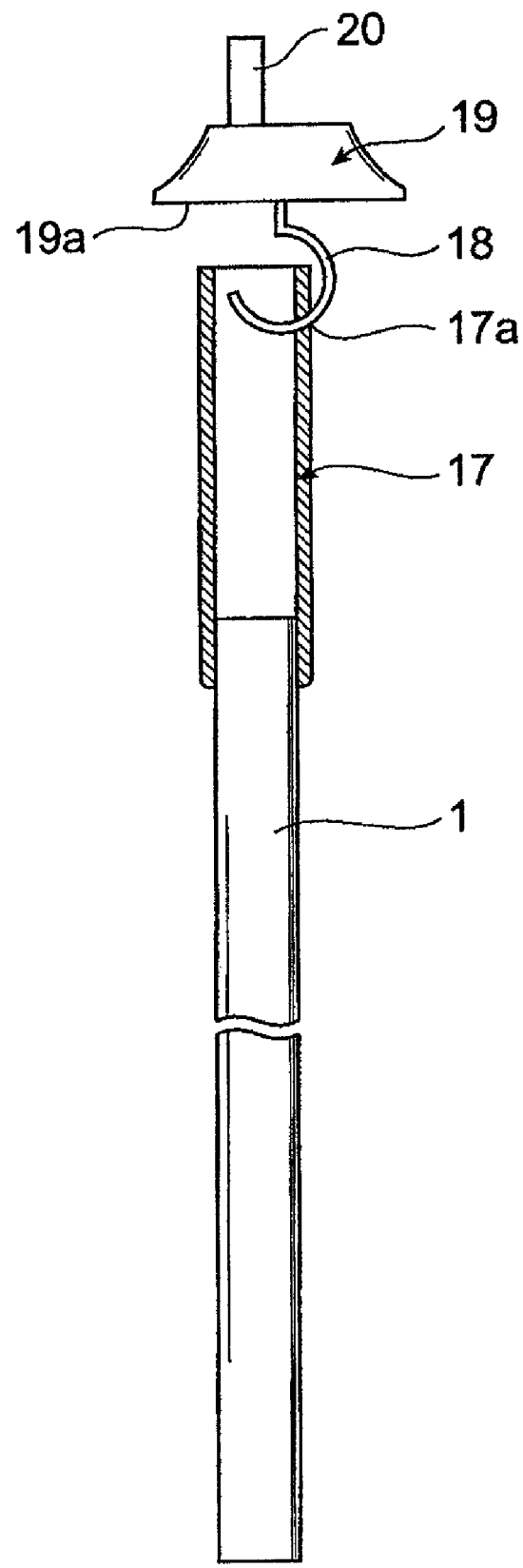
FIG. 6 is a partial cross-sectional view showing an example of the supporting apparatus wherein the plurality of supporting sections are separate and independent.

Furthermore, in the embodiment described above, the plurality of supporting sections 14a are formed integrally in the supporting bar 14; however, the plurality of supporting sections 14a may instead be separate and independent. FIG. 6 is a partial cross-sectional view showing an example of the supporting apparatus wherein the plurality of supporting sections are separate and independent. As shown in FIG. 6, each supporting section comprises: a tube 17 which anchors one end of the support 1; a hook section 18 which supports the tube 17; and a cover section 19 which anchors the hook section 18. The cover section 19 is provided with a handle section 20 to facilitate carrying of the supporting section.

An opening 17a is formed at one end of the tube 17, and the tip of the hook section 18 is hooked on the opening 17a. The base end of the hook section 18 is anchored to the cover section 19. The material of the tube 17 may be silicone, stainless steel or the like, but it is preferably silicone in terms of preventing damage to the support 1.

The cover section 19 has a circular flat surface 19a, and the hook section 18 is anchored to the flat surface 19a. The diameter of the circular flat surface 19a is larger than the distance between the flat surfaces S1, S2 of the reaction container 3. Therefore, when the supporting section is set in the reaction container 3, the flat surface 19a of the cover section 19 is contacted with the upper end surface of the reaction container 3.

In the supporting apparatus comprising a plurality of separate and independent supporting sections, the supporting section may not necessarily comprise a tube 17. In this case, the support 1 will be directly supported by the hook section 18. Also, the shape of the flat surface 19a is not limited to being circular.

EXAMPLES

The present invention will now be explained in greater detail based on examples and comparative examples, with the understanding that the examples below are in no way limitative on the invention.

Example 1

Type A zeolite fine particles (seed crystals; particle size: 100 nm) were placed in water and stirred to prepare a solution with a concentration of 0.5% by weight. A tubular porous support body made of α-alumina (mean pore size: 1.3 μm; outer diameter: 12 mm; inner diameter: 8 mm; length: 100 cm) was immersed for 3 minutes in the solution and then drawn out at a speed of about 0.2 cm/s. After drying for 2 hours in a thermostatic bath at 25° C., it was further dried for 16 hours in a thermostatic bath at 70° C. This procedure was repeated to produce a plurality of cylindrical supports 1.

Two of the plurality of supports 1 obtained in this manner (hereinafter referred to as "support A" and "support B" as necessary) were taken out, and zeolite membranes were formed on these supports 1 using the production apparatus 100 shown in FIGS. 1 and 2.

Specifically, the two supports 1 were first each anchored to the anchoring frame 12. One end of each support 1 was inserted into a supporting section 14a of the supporting bar 14, and then the other end was inserted into an anchoring section 15a of the anchoring bar 15, for anchoring of the supports 1 to the anchoring frame 12.

Meanwhile, 1 part by mole of alumina ($Al_2O_3$), 3.5 parts by mole of silicon dioxide ($SiO_2$) and 8 parts by mole of sodium oxide ($Na_2O$) were added to 300 parts by mole of water to yield a reaction solution 2.

The reaction solution 2 was then introduced into the reaction container 3. The used reaction container 3 had cross-sectional internal dimensions of 55 mm×600 mm. The anchoring frame 12 was then raised with the chain 13, and inserted into the reaction solution 2 from the anchoring bar 15 side through the support insertion opening 3c of the reaction container 3 for immersion in the reaction solution 2. The ends of the supporting bar 14 were received and anchored in notches 3g formed at the top of the reaction container 3. Thus, the two supports 1 were arranged between the mutually opposing flat surfaces S1, S2 in the reaction container 3 and parallel to the flat surfaces S1, S2.

Finally, hot water was introduced into the fluid circulation chamber 9 through the fluid inlet tube 11 to fill it. The filled fluid was drained through the fluid outlet tube 10, and hot water was constantly introduced into the fluid circulation chamber 9 to keep it filled. The reaction solution was heated to about 90° C. via the reaction container for reaction between the alumina ($Al_2O_3$), silicon dioxide ($SiO_2$) and sodium oxide ($Na_2O$) in the reaction solution, to form zeolite membranes on the peripheral surfaces of the supports 1.

Comparative Example 1

Zeolite membranes were obtained in the same manner as in Example 1, except that a production apparatus comprising a cylindrical reaction container with an inner diameter of 210 mm was used instead of the reaction container 3 described above. The shape of the heating apparatus was altered to match the shape of the reaction container. However, the volume of the fluid circulation chamber in the heating apparatus was the same as the volume of the fluid circulation chamber 9 in Example 1.

(Measurement of Separation Performance and Permeation Rate)

For Example 1 and Comparative Example 1, the separation performance and permeation rate were measured for each of the supports A and B on which zeolite membranes had been formed. In order to examine the uniformity of the zeolite membranes formed on the supports A and B, each support was divided into 5 equal sections, which were designated as fractions 1 to 5, and the separation performance and permeation rate were measured for fractions 1, 3 and 5.

Figure 7:
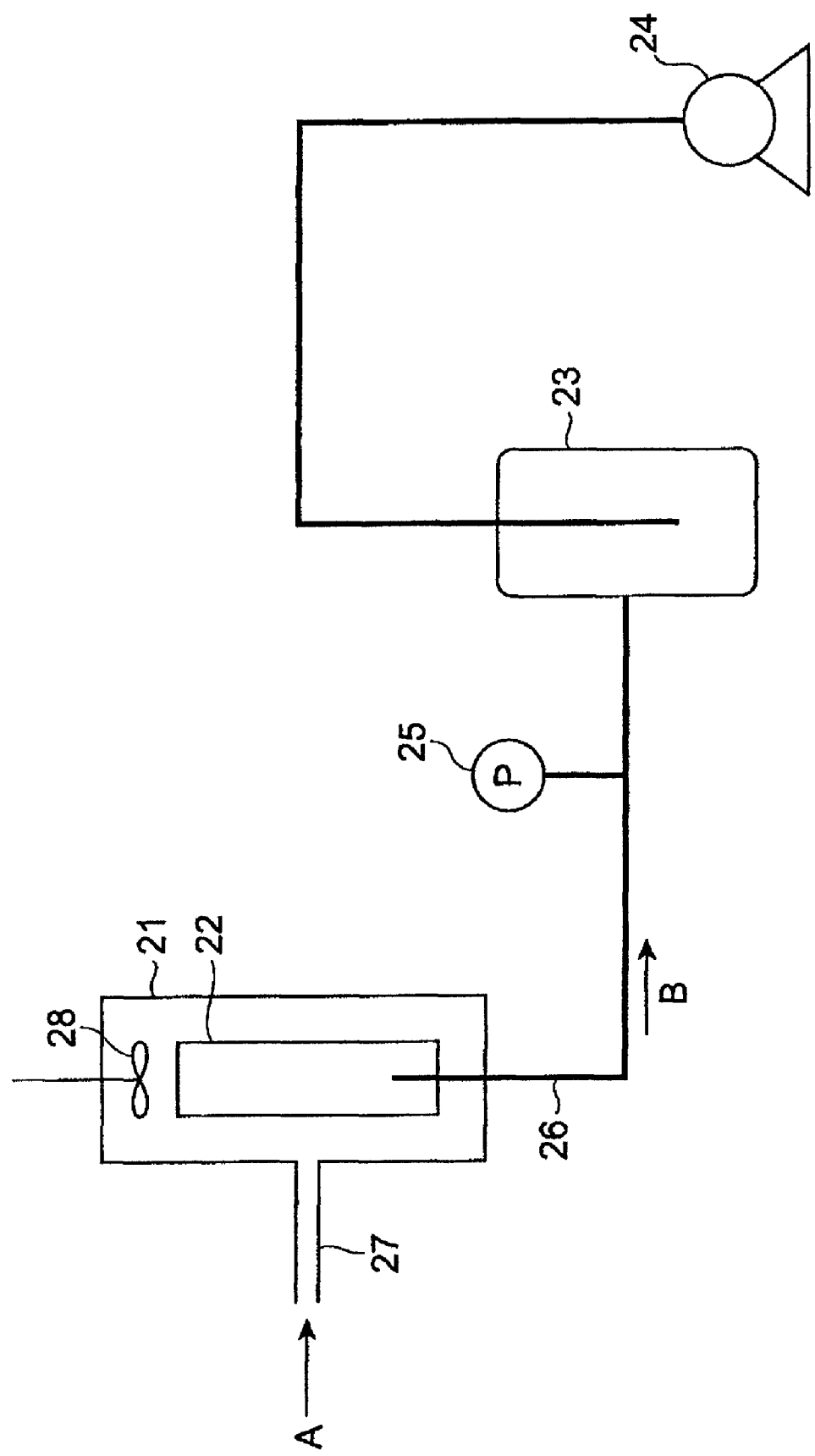
FIG. 7 is a schematic diagram of the pervaporation (PV) test apparatus used in Example 1 and Comparative Example 1.

In order to evaluate the separation performance of the zeolite membranes obtained in Example 1 and Comparative Example 1, a pervaporation (PV) test apparatus shown in FIG. 7 was assembled. The PV test apparatus comprises a supply tank 21 to which a supply fluid A is supplied. A conduit 27 for supply of the supply fluid A to the supply tank 21 is connected to the supply tank 21; and a separator 22 and a stirrer 28 for stirring of the supply fluid A are set in the supply tank 21. The zeolite membrane obtained in Example 1 or Comparative Example 1 was used as the separator 22. A conduit 26 is also connected to the open end of the separator 22, and a vacuum pump 24 is connected to the other end of the conduit 26 via a liquid nitrogen trap 23. A vacuum gauge 25 is also mounted along the conduit 26.

The supply fluid A (ethanol/water weight ratio=90/10) at 75° C. was supplied to the supply tank 21 of the PV test apparatus through the conduit 27, and the interior of the separator 22 was evacuated with the vacuum pump 24 (degree of vacuum by vacuum gauge 25: 10 to 1000 Pa). Fluid B which permeated the separator 22 was collected in the liquid nitrogen trap 23. The compositions of the supply fluid A and fluid B were measured using a gas chromatograph (trade name: GC-14B, product of Shimadzu Corporation), and the separation performance was evaluated. Since a separation performance of at least 2000 generally allows use as a separation membrane, a separation performance of 2000 or greater was evaluated as "A" and a separation performance of less than 2000 was evaluated as "B". In addition, the weight of the collected fluid was measured, and the permeation rate was determined based on the weight, membrane area and collection time. The results are shown in Table 1.

TABLE 1

|  |  |  | Separation performance | Permeation rate (Kg/m²h) |
|---|---|---|---|---|
| Example 1 | Support A | Fraction 1 | A | 5 |
|  |  | Fraction 3 | A | 5 |
|  |  | Fraction 5 | A | 5 |
|  | Support B | Fraction 1 | A | 5 |
|  |  | Fraction 3 | A | 5 |
|  |  | Fraction 5 | A | 5 |
| Comparative Example 1 | Support A | Fraction 1 | B | 3 |
|  |  | Fraction 3 | A | 2 |
|  |  | Fraction 5 | B | 3 |
|  | Support B | Fraction 1 | A | 2 |
|  |  | Fraction 3 | B | 2 |
|  |  | Fraction 5 | B | 2 |

The results of Example 1 and Comparative Example 1 demonstrated that the zeolite membranes obtained in Example 1 had no difference in both separation performance and permeation rate between fractions and between supports, and thus had excellent uniformity, compared to the zeolite membranes obtained in Comparative Example 1.

Therefore, it was confirmed that the zeolite membrane production apparatus of the present invention can simultaneously form on a plurality of supports zeolite membranes which are uniform with respect to the plurality of supports.

INDUSTRIAL APPLICABILITY

The zeolite membrane production apparatus of the present invention can be utilized for production of separation membranes to be used for separation of fluid mixtures such as a mixture of an organic solvent and water.

The invention claimed is:

1. A zeolite membrane production apparatus comprising:
    a reaction container which has a support insertion opening for insertion of tubular supports and which houses a reaction solution for formation of zeolite membranes on the surfaces of the tubular supports,
    a heating means for heating the reaction solution through the reaction container, and
    a supporting apparatus which is provided on the reaction container in a freely detachable manner and which supports a plurality of the tubular supports;
    wherein:
    the inner wall surface of the reaction container has two mutually parallel flat surfaces,
    the supporting apparatus has a plurality of supporting sections that anchor one end of each of the plurality of the tubular supports, and
    the plurality of supporting sections are provided in the supporting apparatus in such a manner that when the supporting apparatus is set in the reaction container, each of the plurality of the tubular supports is disposed between the two flat surfaces and parallel to the two flat surfaces.

2. The zeolite membrane production apparatus according to claim 1, wherein the plurality of supporting sections are arranged linearly.

3. The zeolite membrane production apparatus according to claim 1, wherein the supporting apparatus is further provided with:
    a supporting bar comprising the plurality of supporting sections,
    an anchoring bar positioned opposite the supporting bar and comprising a plurality of anchoring sections that anchor the other end of each of the plurality of the tubular supports, and
    a connecting member which connects the supporting bar and the anchoring bar.

4. The zeolite membrane production apparatus according to claim 1, wherein the plurality of supporting sections are arranged at equal spacings.

5. The zeolite membrane production apparatus according to claim 1, wherein the reaction container has at least one outlet at the bottom surface, and the outlet has a tapered shape such that the opening area decreases with distance from the bottom surface.

6. The zeolite membrane production apparatus according to claim 2, wherein the supporting apparatus is further provided with:
    a supporting bar comprising the plurality of supporting sections,
    an anchoring bar positioned opposite the supporting bar and comprising a plurality of anchoring sections that anchor the other end of each of the plurality of the tubular supports, and
    a connecting member which connects the supporting bar and the anchoring bar.

7. The zeolite membrane production apparatus according to claim 2, wherein the plurality of supporting sections are arranged at equal spacings.

8. The zeolite membrane production apparatus according to claim 3, wherein the plurality of supporting sections are arranged at equal spacings.

9. The zeolite membrane production apparatus according to claim 6, wherein the plurality of supporting sections are arranged at equal spacings.

10. The zeolite membrane production apparatus according to claim 2, wherein the reaction container has at least one outlet at the bottom surface, and the outlet has a tapered shape such that the opening area decreases with distance from the bottom surface.

11. The zeolite membrane production apparatus according to claim 3, wherein the reaction container has at least one outlet at the bottom surface, and the outlet has a tapered shape such that the opening area decreases with distance from the bottom surface.

12. The zeolite membrane production apparatus according to claim 4, wherein the reaction container has at least one outlet at the bottom surface, and the outlet has a tapered shape such that the opening area decreases with distance from the bottom surface.

13. The zeolite membrane production apparatus according to claim 6, wherein the reaction container has at least one outlet at the bottom surface, and the outlet has a tapered shape such that the opening area decreases with distance from the bottom surface.

14. The zeolite membrane production apparatus according to claim 7, wherein the reaction container has at least one outlet at the bottom surface, and the outlet has a tapered shape such that the opening area decreases with distance from the bottom surface.

15. The zeolite membrane production apparatus according to claim 8, wherein the reaction container has at least one outlet at the bottom surface, and the outlet has a tapered shape such that the opening area decreases with distance from the bottom surface.

16. The zeolite membrane production apparatus according to claim 9, wherein the reaction container has at least one outlet at the bottom surface, and the outlet has a tapered shape such that the opening area decreases with distance from the bottom surface.

* * * * *